Fig. 1

Inventor:
Paul Kohl
BY: Bailey, Stephens & Huettig
Attorneys

May 2, 1961 P. KOHL 2,982,143
TAPE CONTROL FOR DUPLICATING MACHINES
Filed June 4, 1958 8 Sheets-Sheet 5

Inventor:
Paul Kohl
By: Bailey, Stephens & Huettig
Attorneys

United States Patent Office 2,982,143
Patented May 2, 1961

2,982,143
TAPE CONTROL FOR DUPLICATING MACHINES

Paul Kohl, Frankfurt am Main, Germany, assignor, by mesne assignments, to Nassovia Werkzeugmaschinenfabrik G.m.b.H., Langen, Hessen, Germany Filed June 4, 1958, Ser. No. 739,898

Claims priority, application Germany June 6, 1957

5 Claims. (Cl. 74—365)

The present invention relates to a remote control apparatus for machine tools, and more particularly to a tape-controlled apparatus for operating duplicating machines, and especially duplicating milling machines and the like.

For the operation of duplicating machines, it is known to carry out the various control operations by means of different tapes, for example, perforated tapes, sound tapes, or photo-electric tapes. The respective traveling tape is adapted to release control impulses which, by amplifying means and control elements, are used, for example, for the operation of electromagnetic clutches for engaging or disengaging the feed spindles of the individual slides of such machines or for reversing the direction of rotation thereof. The known designs of control apparatus of this type have the disadvantage of requiring the acceleration of very large masses, for example, of very large electromagnetic clutches, in order to adjust the heavy slides of machine tools. However, in accelerating and stopping the movement of such large masses it is very difficult and sometimes even impossible to attain an accurate control of the position of the slides because of the difficulty of starting and stopping the spindle nuts on the feed spindles. Consequently, the duplicating operations are often very inaccurate. Furthermore, in the known tape controls, with the exception of sound and photo-electric tape controls, the electrical control operation also results in an excessive wear upon the contacts because of the high tension and amperage which is usually required in order to insure a proper contact-making and thus a proper control operation, even though the respective contacts are soiled.

It is an object of the present invention to provide a tape-controlled apparatus of the above-mentioned kind which, however, does not possess the disadvantages of the prior apparatus.

A further object of the present invention is to avoid the usual direct control of the driving means of the heavy work slides of machine tools, and to provide a control of these means by the use of relatively small control elements which, in turn, may be easily and accurately operated by means of small electric control units, clutches, reversing gears or motors, hydraulically actuated pistons, or the like.

These objects of the invention may be attained by providing an apparatus which comprises a tape-controlled switch by means of which current impulses, which are controlled by projections, apertures or the like on or in the tape may be transmitted through a contact ring to which the switch is connected, and through a collector in the form of a ring segment which is rotatably mounted within the contact ring, to a control unit. This control unit is then adapted to control the operation of a reversible drive unit which, in turn, is adapted to adjust an actuating element of a mechanism which controls the operation of one of the slides of the respective duplicating machine.

The operation of the apparatus according to the invention is substantially as follows:

When a contact is made by the tape switch, a current impulse is transmitted from the switch through the contact ring and the collector in the form of a ring segment to the control unit which is designed in the form of an electronic apparatus which is provided with two vacuum tubes or the like. One of these tubes controls the reversible drive, preferably an electromagnetic reversing gear, and a shaft or spindle which is driven thereby, as well as the collector in the form of a ring segment which is mounted on this shaft so as to rotate, for example, in a clockwise direction. The other vacuum tube is adapted to reverse the movement of the reversing gear and the shaft with the collector thereon so as to rotate counterclockwise when the contact is broken in the tape switch or between the contact ring and the collector. The actuating element which is adjustable by the mentioned shaft or spindle in the longitudinal direction thereof and toward both sides will thus transmit certain control movements to the mechanism, which controls the operation of the respective slide of the duplicating machine and it will continue doing so until one of the contacts of the contact ring, which is supplied with current from the tape switch, arrives in an oscillatory, but substantially stationary position relative to the collector in the form of a ring segment. Whenever a new contact is closed in the tape switch, the collector within the contact ring will again be turned by the reversing gear until the mentioned oscillatory position again occurs. At this turning motion of the collector, the actuating element of the control mechanism of the respective slide will again be adjusted so as to effect the required movement of the slide. The more contact points will be provided on the control tape and accordingly also in the tape switch and on the contact ring, the more sensitive will be the control which will be transmitted through the actuating element, and the more gradual will be the stepwise adjustments of the slide, so that the entire adjustment will be substantially continuous.

The apparatus according to the invention is also adapted to control the operation of several machines and/or to control the movement of several slides on each machine which are arranged, for example, according to the space-coordinate system or which are coordinated with each other in any other suitable manner. The individual machines or slides thereof may also be controlled to operate in the same manner or in the opposite manner to each other, or to carry out their movements in a proportionate relationship to each other. The preset course to be followed by at least one slide of each of the various machines may then all be controlled by a single tape and tape switch and a single electronic control unit. The different preset courses to be followed may also be entered on a single tape side-by-side of each other as seen in the direction of travel of the tape.

By replacing the tape switch by a contact ring and a collector which is rotatable therein, it is also possible to apply the apparatus according to the invention for controlling the operation of one or more duplicating machines so as to follow the movements of a master machine which scans a pattern. Each slide of the master machine is then equipped with a driven element which is rotated in accordance with the movement of the respective slide of this machine and which, in turn, rotates the collector which is connected to a source of electric current. The current impulse is then transmitted from the collector through the contact ring to the contact ring of the follow-up machine or machines for carrying out the control operation by means of the apparatus according to the invention. Further objects, features, and advantages of the present invention will become apparent from the following detailed description thereof, particularly when read with reference to the accompanying drawings, in which—

Figure 8 shows the control of several follow-up machines by means of an apparatus according to the invention and a master machine scanning a pattern; while

The present invention will now be described with reference to a profile-duplicating milling machine, the longitudinal slide of which is movable from the front toward the rear, as seen within the plane of Figure 1, while the cross slide 2 is movable from the left toward the right, and the tool slide 3 is movable in both vertical directions. Each slide is for this purpose provided with a separate drive unit of a type known as such, for example a hydraulic drive 4, as illustrated diagrammatically in Figure 2, which is automatically controlled by an apparatus according to the invention. For the sake of simplicity, this apparatus is only illustrated in connection with the cross slide 2. The control means which are to be applied in connection with slides 1 and 3 correspond both insofar as their construction and function are concerned to the control means as illustrated, so that a separate description thereof will be superfluous.

Figure 1:
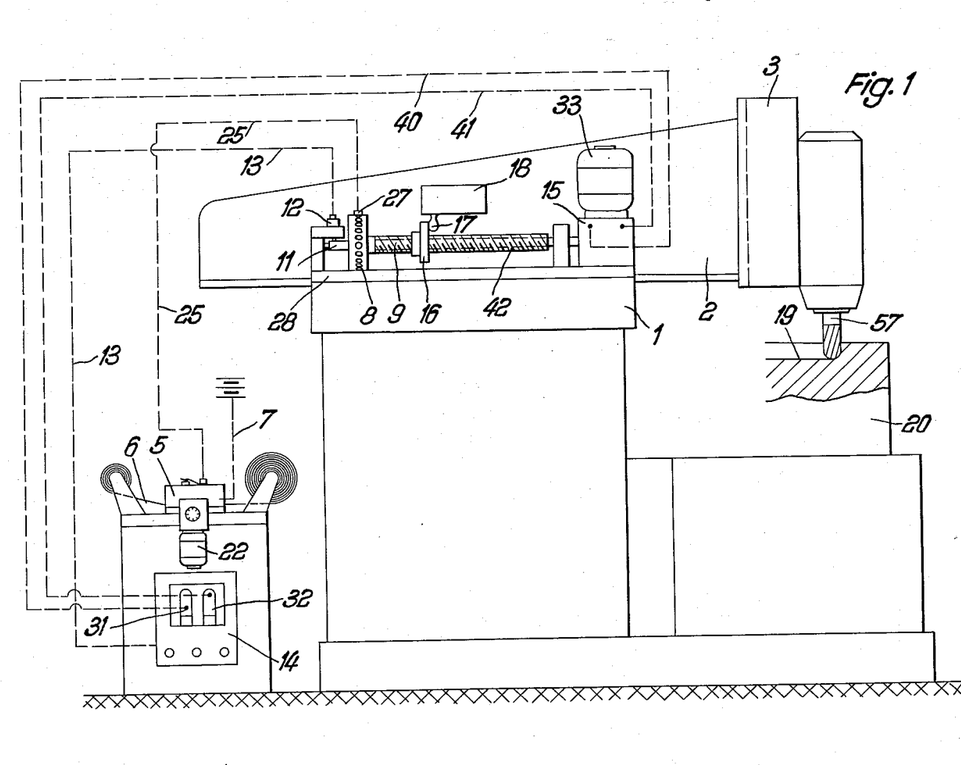
Figure 1 shows a simplified illustration of a duplicating milling machine together with a tape-controlled apparatus according to the invention, as seen in the side view.
Figure 3:
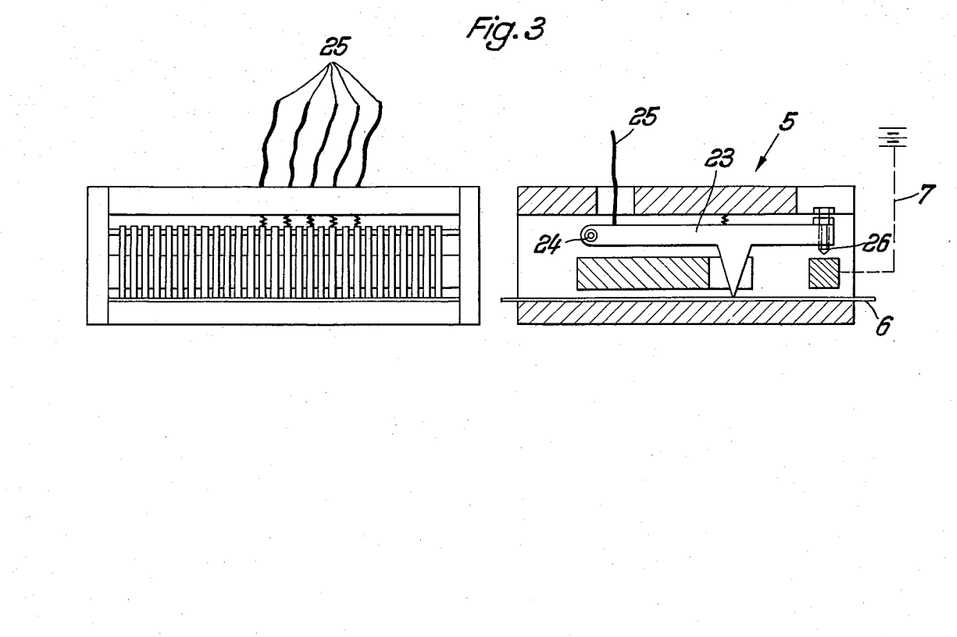
Figure 3 shows an end view, as well as a side view in a longitudinal section, of a tape switch according to the invention.

The control mechanism according to the invention consists primarily of a so-called tape switch 5, as shown in Figures 1 and 3, which, when a tape 6 which is suitably prepared as subsequently described passes therethrough, is adapted to open and close electrical contacts, each of which is electrically connected through a conductor 25 to a contact on a contact ring 8, as shown particularly in Figure 4. A segment switch composed of contact segment or current collector 10, which is rotatable within contact ring 8, and a slip ring 11 are both mounted on and mechanically driven by the shaft of a threaded spindle 9 and form an electric connection through a current collector or carbon brush 12 and a conductor 13 to a control unit switch 14 which controls the operation of a reversible drive unit 15 for driving spindle 9. Depending upon the action upon drive unit 15, spindle 9 will be rotated either toward the right or the left, whereby an actuating member 16 which threadedly engages with spindle 9 will be shifted longitudinally along spindle 9 and thereby actuate a control arm 17 of a follow-up control unit 18 which controls the hydraulic drive 4 of slide 2.

Figure 5:
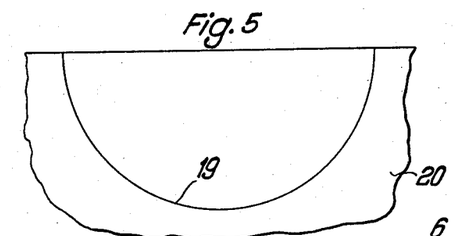
Figure 5 shows a plan view of a workpiece in which a semicircular recess has been milled out.
Figure 6:
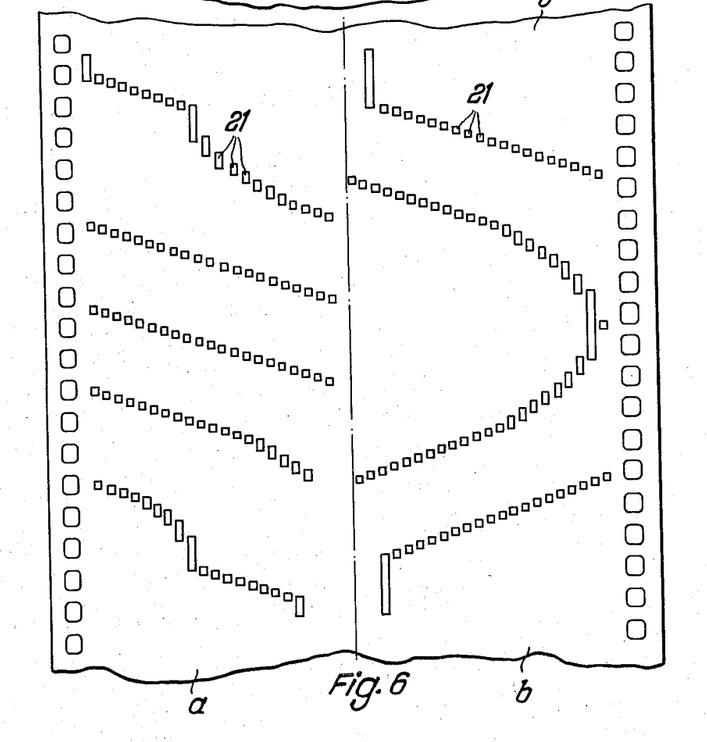
Figure 6 shows a plan view of a control tape.

Figure 6 illustrates on an enlarged scale a section of a tape 6 for milling a semicircular contour 19 as shown in Figure 5 out of a workpiece 20. Since such an operation requires the movement of two slides, i.e. the longitudinal slide 1 and the cross slide 2, tape 6 may be regarded as being divided in the longitudinal direction into two sections $a$ and $b$, as indicated by the dot-and-dash line in Figure 6. By means of separate control units, one section serves for controlling one slide and the other section the other slide. If it is also necessary to control the movements of the third slide, tape 6 has to have a similar third section. Tape 6 is provided with contact-making points 21 which produce the contour of the recess to be milled out in accordance with the direction of movement of the tape. The contact-making points 21 which may be in the form of recesses, perforations or projections are adapted to raise or lower one of the contact fingers 23 in tape switch 5, which is tantamount to an opening or closing of the respective contact 26, as shown in Figure 3. The more contact points are provided on tape 6 and the more closely they are spaced from each other, the more gradual will be the steplike adjustment of the slides.

Tape 6 is driven by a motor 22 through tape switch 5 which is adapted to scan the tape and is connected by a conductor 7 to a source of current. As shown in Figure 3, tape switch 5 is provided with a plurality of contact fingers 23 which are pivotably mounted at 24 and correspond in number to the number of contact points 21 provided on tape 6. Each contact finger is connected by a conductor 25 to a corresponding contact 27 on a contact ring 8, as shown in Figure 4.

Contact ring 8 is mounted, for example, on a stationary base 28 on each of the slides of the machine. At the inside of contact ring 8, a disk 29 is mounted on spindle 9 so as to rotate therewith. Disk 29 carries, insulated therefrom, the collector 10 which is connected by a conductor 30 to slip ring 11. This slip ring 11 is likewise mounted on, but insulated from shaft 9 which is rotatably mounted in suitable bearings on base 28.

Figure 2:
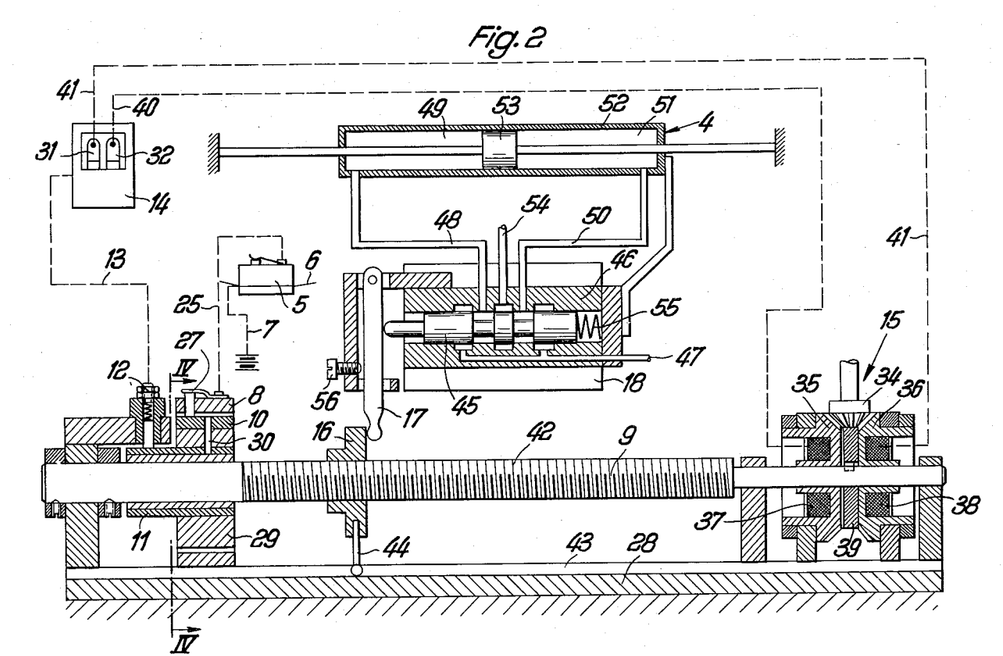
Figure 2 shows, partly in cross section and on a larger scale, some of the details of the tape-controlled apparatus according to the invention as shown in Figure 1.

The control unit switch 14, as shown particularly in Figures 1 and 2, which is connected to slip ring 11 through the carbon brush 12 and conductor 13, may, for example, operate electronically by means of a pair of vacuum tubes 31 and 32. This electronic unit controls the reversible drive unit 15 of spindle 9 which may consist of a small electromagnetic reversing gear or a small reversible motor or electromagnetic reversing valves for a suitable hydraulic reversing mechanism. Preferably, however, the reversible drive unit 15 consists of an electromagnetic reversing gear which, according to Figure 2, consists of a pair of bevel gears 35 and 36 which are loosely rotating on the shaft of spindle 9 and are driven by an electric motor 33 through a bevel gear 34. Each bevel gear 35 and 36 contains a solenoid 37 or 38, respectively. Between bevel gears 35 and 36 a clutch disk 39 is nonrotatably, but slidably mounted on the shaft of spindle 9. Depending upon which solenoid is energized by the electronic control unit switch 14 through conductors 40 and 41, clutch disk 39 will be attracted toward one bevel gear or the other and thereby transmit either the rotation of gear 35 or of gear 36 to spindle 9 so that the latter will be driven either in a clockwise or counter-clockwise direction.

The reversing gear 15 is operated by the electronic control unit switch 14 according to the so-called on-off control method. Thus, for example, if a current impulse is transmitted from tape switch 5 through a contact 27 on contact ring 8, collector 10, slip ring 11, brush 12, and conductor 13 to vacuum tube 31, this tube will respond and transmit an energizing current to solenoid 38, whereby spindle 9 may, for example, be driven in a clockwise direction. If, however, contact 27 of contact ring 8 does not engage the collector 10, or if no current impulse is sent from tape switch 5 because contact 26 is opened, the other vacuum tube 32 of control unit switch 14 will be actuated so that the other solenoid 37 will be energized and spindle 9 will be rotated in the counter-clockwise direction.

As already indicated, the central part of spindle 9 is provided with a screw thread 42 on which the internally threaded member 16 is mounted so as to be slidable in the longitudinal direction of spindle 9. Member 16 has an extension or pin 44 thereon which is adapted to slide along a guideway 43 and prevents member 16 from rotating. Member 16 is adapted to engage upon a control arm 17 which, in turn, acts upon the control unit 18 for the hydraulic drive 4 of the respective slide of the machine. Control unit 18 consists of a control piston 45 which is slidable within a cylinder 46 which is mounted on slide 2 or on the main cylinder 52. A hydraulic pressure medium, for example, oil, is supplied from a suitable source, not shown, through a conduit 47 to control cylinder 46 and then, depending upon the position of control piston 45, either through conduit 48 to the left chamber 49 or through conduit 50 to the right chamber 51 of the main cylinder 52 which is mounted in the usual manner either within or on the respective slide of the machine. A third conduit 54 leads back to the source of pressure. The main piston 53 is mounted in a fixed position relative to the slide and main cylinder 52.

Instead of acting upon control piston 45 through an intermediate control arm 17, as shown in Figure 2, the actuating member 16 may also engage directly upon control piston 45. The latter may be further acted upon by a suitable spring element, for example, a compression spring 55, which tends to press control piston 45 toward the left. The extent of the movement of piston 45 may be adjusted by a setscrew 56.

Figure 4:
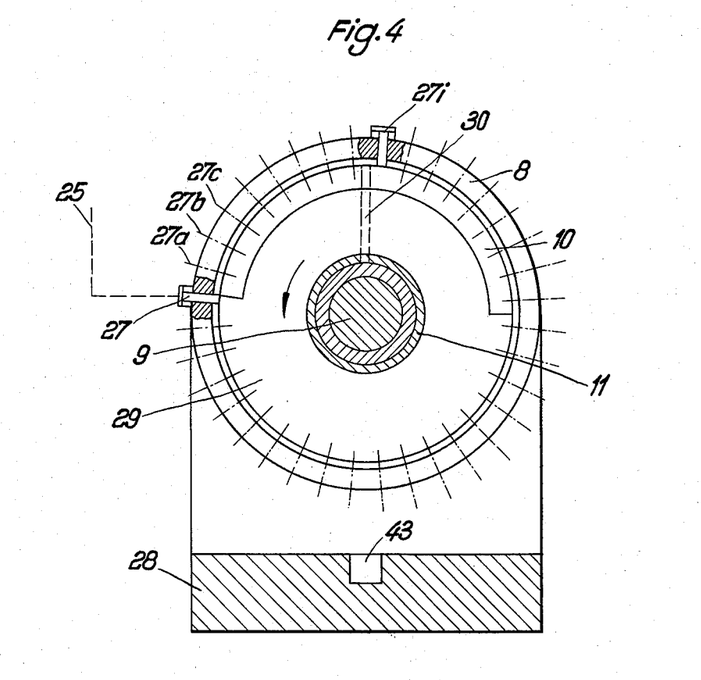
Figure 4 shows a cross section of a contact ring with a collector in the form of a ring segment, taken along line IV—IV of Figure 2.

For explaining the operation of contact ring 8 and the collector 10, it may be assumed with reference to Figure 4 that a contact finger 23 of tape switch 5, as shown in Figure 3, engages with an actuating point 21 on tape 6. Contact 26 will then be closed so that the current will flow from conductor 7 through contact 26 and conductor 25 to contact 27 of contact ring 8. Since contact 27, as shown in Figure 4, does not engage with collector 10, no current will flow to the electronic control unit switch 14 so that the latter, as already described, will energize the reversing gear 15 so as to start a counter-clockwise rotation of spindle 9 and collector 10, as indicated by the arrow in Figure 4. This will move collector 10 into engagement with contact 27 so that the current coming from tape switch 5 will flow directly to control unit 14 which thereupon reverses the position of the reversing gear 15 and thus starts a clockwise rotation of spindle 9. This, in turn, causes a disengagement of contact 27 and collector 10 so that the current supply to control unit switch 14 will again be interrupted and spindle 9 will again rotate counter-clockwise. Consequently, there will be a continuous oscillation between contact 27 and collector 10, which means that actuating member 16 will be practically stopped on spindle 9. Control piston 45 of control unit 18 will then be disposed in the neutral position, as indicated in Figure 2.

Piston 56 of the hydraulic drive 4 will then not be acted upon on either side so that slide 2 will be standing still.

If by the continued travel of tape 6 another contact finger 23 of tape switch 5 should supply current, for example, to contact 27a of contact ring 8, in which case the previously mentioned contact finger 23 will be dead, spindle 9 will be immediately turned toward the right since contact 27a and collector 10 are in engagement with each other, and this right-hand movement of spindle 9 will continue until the continuous oscillation again occurs, but at this time, between contact 27a and collector 10. By the right-hand rotation of spindle 9, actuating member 16 will be shifted toward the right and will thereby also shift control piston 45 toward the right against the action of spring 55, so that the right-side branch of conduit 47 will be opened. The pressure medium will then flow through conduit 50 into cylinder chamber 51 and thereby shift cross slide 2 toward the right since the latter is rigidly connected to main cylinder 52 and piston 53 is mounted in a stationary position. Consequently, tool 57 will press against and mill new material out of workpiece 20. Cross slide 2 will then continue to be shifted toward the right until actuating member 16 is again practically brought to a stop because of the quick change of the direction of rotation of spindle 9 during the oscillation between contact 27a and collector 10, so that a hydraulic equilibrium will be attained in control unit 18 because of the return of control piston 45 to its neutral position.

Collector 10 preferably has an extent of about 180° so as to insure a proper follow-up control regardless of whether the distances between the contact points on the tape switch are small or large.

From the illustration of a tape as shown in Figure 6 it may be seen that contact points 21 are arranged so as partly to overlap each other in the direction of travel of the tape. Such overlapping of adjacent contact points insures that the electrical step on contact ring 8 will be properly carried out. The on-off course of the electronic control as above described can never be disrupted because during the travel of the tape a new contact will be made in tape switch 5 with the contact point 21 before the contact with the previous contact point has become disengaged. By providing contact points 21 on tape 6 in a suitable arrangement, it will be possible to control the movements of the different slides in such a manner that either only one or the other of the three slides will be actuated at the same time or that two or all three slides will be actuated at the same time. Thus, any desired shape or contour may be duplicated from the tape and cut out of the workpiece completely automatically.

Figure 7:
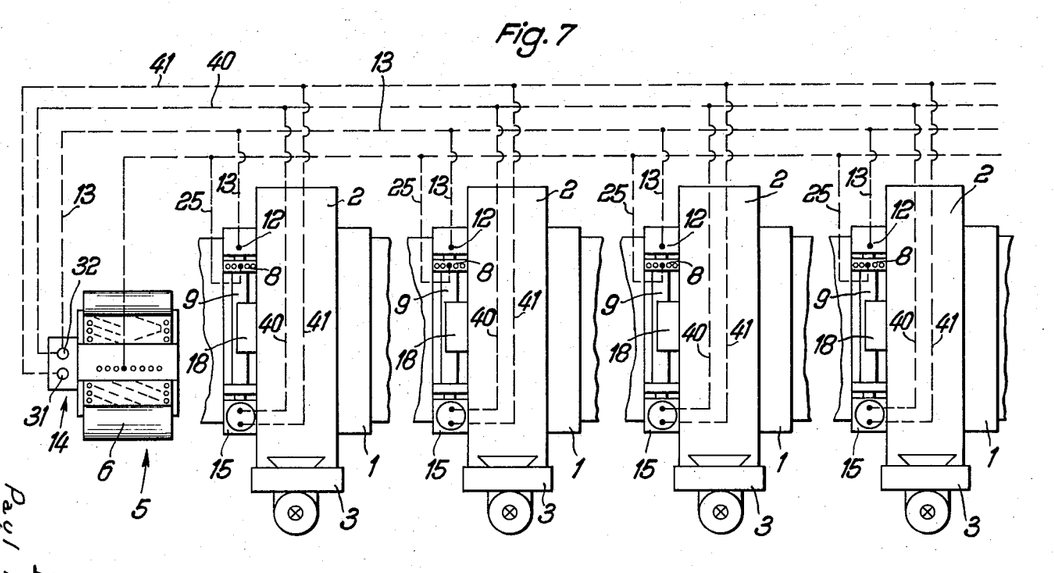
Figure 7 shows an assembly of several machines which are controlled by one tape.

While the control mechanism according to the invention has so far been described for the operation of only one machine tool, it may also be applied to a larger number of machines, all of which carry out the same duplicating operation and which may even be located at considerable distances from each other. Such an arrangement is illustrated in Figure 7 which does not require any special explanation since the function of each machine will be the same as previously described.

If in the individual machines the spindles 9 of the different slides are once provided with right-hand threads and in another machine with left-hand threads, or if they are provided with an electric reversing switch, for example, in tape switch 5, it will be possible by means of the same tape to produce in the different workpieces either an image or a mirror image of the master design laid out on the tape. If spindles 9 are provided with threads of a different pitch, it is also possible either to enlarge or reduce the dimensions to be duplicated from the master design on the tape.

Figure 8:
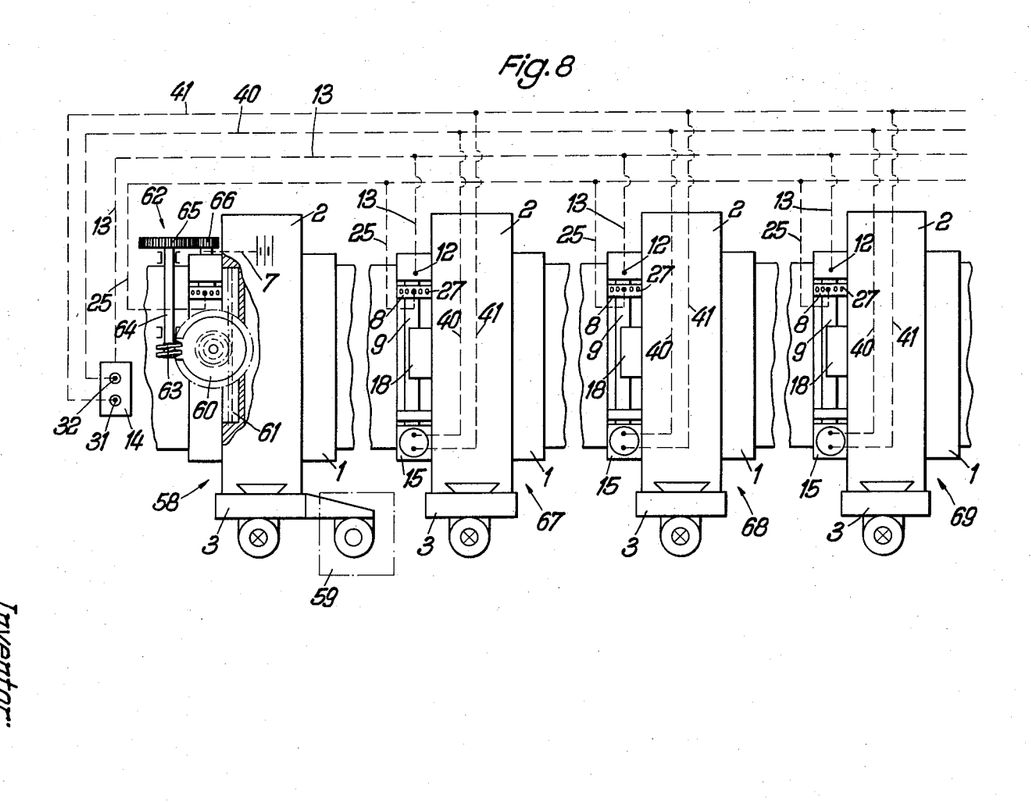
Figure 9:
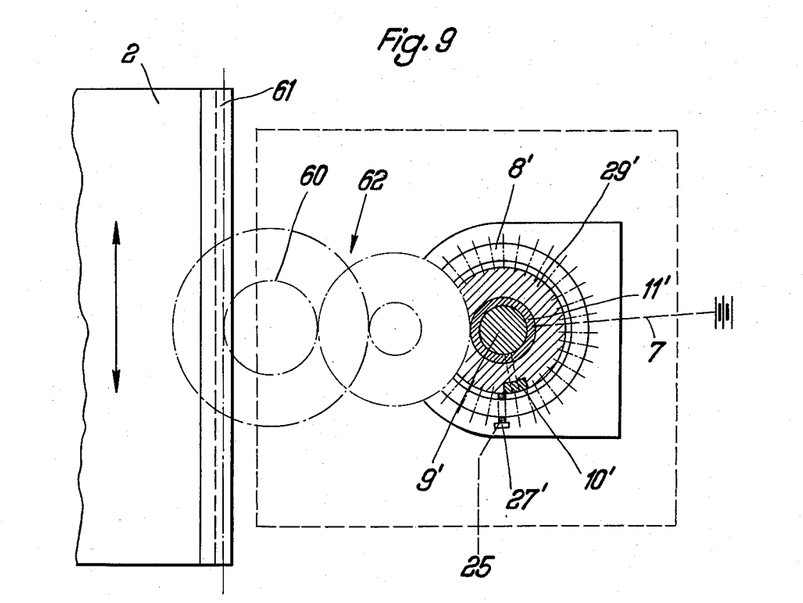
Figure 9 shows an apparatus according to the invention as applied to the master machine as illustrated in Figure 8.

Figures 8 and 9 illustrate diagrammatically how it is possible by a slight modification also to apply the tape control according to the invention to conventional duplicating machines, for example, duplicating milling machines, which duplicate from a pattern. It is thus possible to duplicate a single pattern simultaneously on several machines. In view of the remote-control system according to the invention, it is also immaterial where the different machines are located with respect to each other. Each slide 1, 2, and 3 of a standard duplicating milling machine 58 which serves as a master machine and scans a pattern 59 is provided with a driven element, for example, a gear wheel 60, which follows the movement of the respective slide, for example, by engaging with a rack 61 on the slide or in any other suitable manner. As diagrammatically illustrated in Figure 9, the rotary movements of gear wheel 60 are then transmitted to the shaft of a spindle 9', for example, by means of an intermediate gearing 62 which may consist of a gear 63, a shaft 64, and gears 65 and 66. Just like spindle 9, as described with relation to Figures 1, 2, and 4, this spindle 9' carries a slip ring 11' and a disk 29' with a collector 10', which in this case is made of a slightly greater length than the distance between two adjacent contacts 27' on a contact ring 8' within which disk 29' rotates in the same manner as disk 29 within contact ring 8. This latter provision should be made so as to insure that the electrical step on contact ring 8 will be properly carried out. The electric current which is supplied through conductor 7 to slip ring 11' will then flow from each contact 27' through a conductor 25 to the respective contact 27 on the contact ring 8 of each of the follow-up machines 67, 68, 69, etc. Thus, the same result will be attained as that described with respect to Figures 1 and 2. In this modified arrangement, contact ring 8' together with collector 10' assume the function of tape switch 5. The opening and closing of the contact formed between collector 10' and contacts 27' on contact ring 8' result in the on-off control operation of the electronic control unit switch 14 as previously described, so that the follow-up machines will be controlled so that the slides thereof will travel the same or a proportional distance in either the same or the opposite direction as the slides of the master machine.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A control apparatus for a machine tool having a tape controlled tool slide comprising a tape operated switch, a reversible drive unit for the tool slide, a control unit switch electrically connected to said reversible drive unit for normal movement of said drive in a first direction, and a segment switch electrically interconnected between said tape operated switch and said control unit switch and mechanically driven by said reversible drive unit for reversing said control unit switch and the direction of movement of said reversible drive upon closing of said segment switch.

2. A control apparatus as in claim 1, said tape operated switch having a plurality of contact points and said segment switch having an equal number of contacts in the same order as the tape operated switch contacts mounted on a contact ring.

3. A control apparatus as in claim 2, said reversible drive comprising a threaded drive unit shaft joined to the tool slide with said segment contact ring mounted thereon, a follow up mechanism actuating stop member threaded on said shaft, and guide means holding said stop member for non-rotatable longitudinal movement on said shaft.

4. A control apparatus as in claim 3, said reversible drive unit including a solenoid operated electro-magnetic reversing gear connected to said control unit.

5. A control apparatus for a machine tool having a tape controlled rotating shaft comprising a tape operated switch, a reversible drive unit for the rotating shaft, a control unit switch connected to said reversible drive for normal movement of said drive unit in a first direction, and a segment switch interconnected between said tape operated switch and said control unit switch and driven by said reversible drive unit for reversing said control unit switch and the direction of movement of said reversible drive unit upon closing of said segment switch.

References Cited in the file of this patent

UNITED STATES PATENTS

| | | |
|---|---|---|
| 2,354,391 | Mc Court | July 25, 1944 |
| 2,367,568 | Drown | Jan. 16, 1945 |
| 2,656,497 | Schweighofer et al. | Oct. 20, 1953 |
| 2,672,067 | Hansell | Mar. 16, 1954 |
| 2,710,934 | Senn | June 14, 1955 |
| 2,755,422 | Livingston | July 17, 1956 |
| 2,774,922 | Thomas | Dec. 18, 1956 |
| 2,820,187 | Parsons et al. | Jan. 14, 1958 |